March 15, 1932. E. R. BOLLER 1,849,704
FERTILIZER MANUFACTURE
Filed Oct. 31, 1930
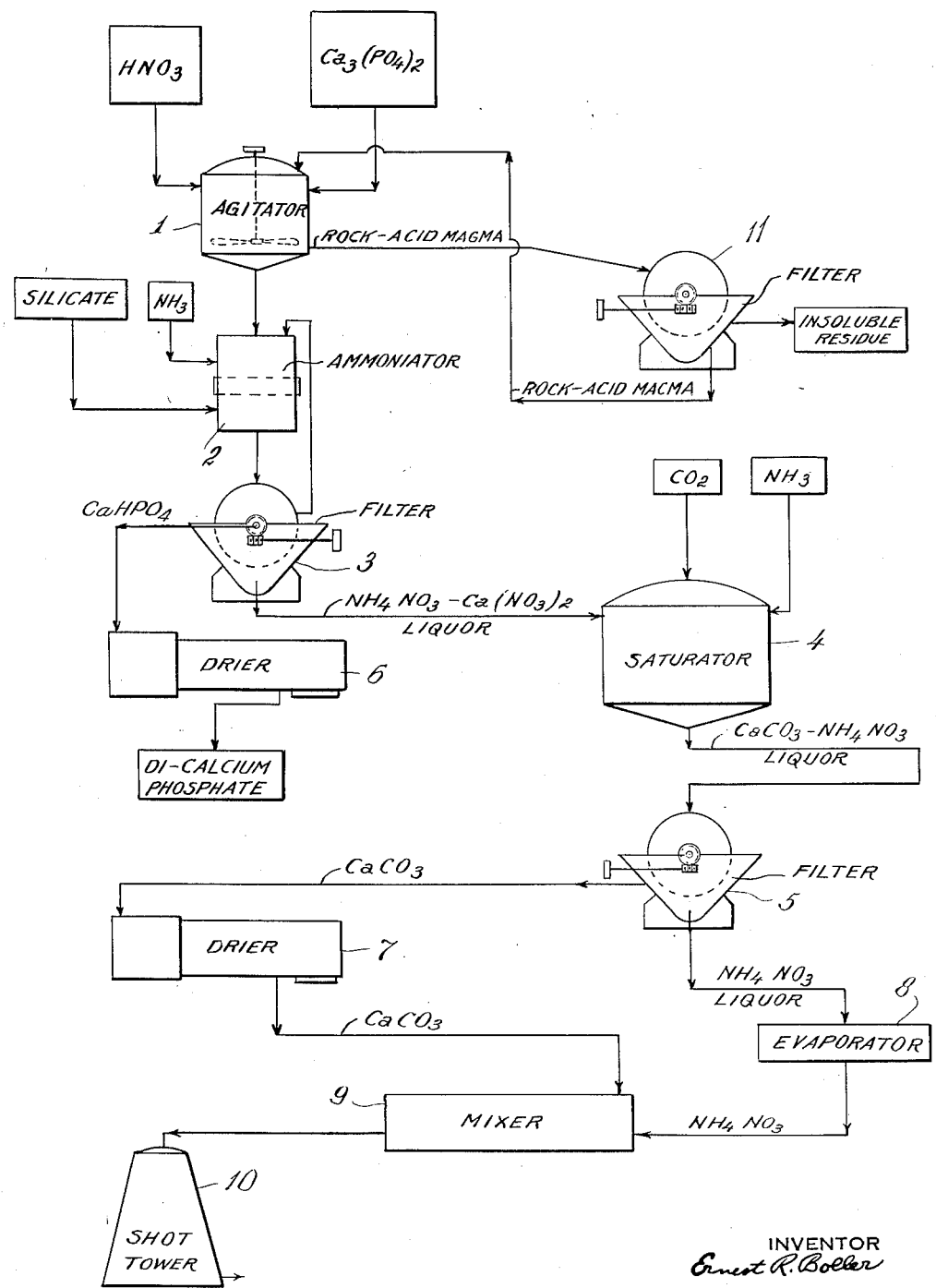
INVENTOR
Ernest R. Boller
BY
W. R. Gawthrop
ATTORNEY Patented Mar. 15, 1932

1,849,704

UNITED STATES PATENT OFFICE

ERNEST R. BOLLER, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

FERTILIZER MANUFACTURE

Application filed October 31, 1930. Serial No. 492,405.

This invention relates to fertilizers and more particularly to phosphatic and nitrogenous fertilizers and methods for the manufacture thereof.

It is well known that phosphorus, nitrogen and potassium are essential for the propagation, growth and development of plants. It is also known that in some cases calcium may be assimilated by plants and is otherwise beneficial to plant life. Various compounds of the above named elements are employed as fertilizers. For example, calcium carbonate is of recognized high value in sweetening soils or eliminating soil acidity. Of the phosphatic fertilizers, dicalcium phosphate, normally designated by the formula $CaHPO_4$, is widely used either alone or in fertilizer mixtures. A fertilizer of this type is desirable because of the $P_2O_5$ contained therein which is readily available for plant consumption. Of the nitrogenated fertilizers those containing ammonium nitrate and calcium carbonate are well adapted to fertilizing purposes particularly when applied to soils of relatively high acidity.

It is also known that dicalcium phosphate can be produced by precipitation from a solution of phosphoric acid and calcium nitrate containing a suspension of monocalcium phosphate by reacting ammonia therewith. Thus Brunner and Zanner in British Patent 18,324 of 1891, produce dicalcium phosphate by treating phosphate rock with nitric acid or with a mixture of nitric and sulfuric acids and reacting the resultant solution with ammonia to precipitate dicalcium phosphate.

My research has shown, however, that when an attempt is made to commercially apply this process the specific conditions and method of working are of the greatest practical importance and these have not heretofore been disclosed. The prior art is deficient in giving directions or indications as to procedure for satisfactory operation to obtain results commercially practicable in the production of dicalcium phosphate.

It is the object of the present invention to provide a new and improved process for producing dicalcium phosphate.

It is a further object of the invention to produce dicalcium phosphate and a calcium carbonate-ammonium nitrate fertilizer from phosphate rock, nitric acid, ammonia and carbon dioxide.

Additional objects and advantages of the invention will be apparent as it is more fully understood by reference to the following specification and to the accompanying drawing in which the figure is a diagrammatic representation of an arrangement of apparatus suitable for the practice of the invention.

My researches have shown that the problem of the practical production of dicalcium phosphate as referred to is dependent upon not one but a number of important factors and conditions without proper regard for which uneconomical results are obtained. My invention accordingly embodies a new method of operation involving a combination of certain specific and detailed conditions by virtue of observing which the practical and economical production of dicalcium phosphate is made possible.

My investigations have shown that the concentrations of the reactants and the reaction mixture at certain stages in the production of dicalcium phosphate by reaction of phosphate rock and nitric acid and addition of ammonia to the resultant magma has an important bearing on the character of the results obtained. Thus, I have observed that unless relatively concentrated nitric acid, for example, of a strength of about 40% or better, is employed in decomposing the rock the decomposition will not proceed at a practical rate. On the other hand, when such relatively concentrated acid is employed as is, for the practical reasons indicated, required, the resultant magma is of such a physical character that the handling and treatment thereof in subsequent operations of the process is very difficult and upon reaction of ammonia therewith an undesirably high percentage of unavailable or citrate insoluble $P_2O_5$ is recovered in association with dicalcium phosphate. I have found, however, that these difficulties are obviated if the phosphate rock is decomposed with relatively concentrated nitric acid and the resultant magma is diluted before ammoniation. As a diluting agent water may be employed or suitable aqueous solutions, especially solutions containing one or more of the intermediate products of the process, as, for example, calcium nitrate and ammonium nitrate. Preferably I employ, as a diluting agent, a portion of the ammonium nitrate or ammonium nitrate-calcium nitrate liquor produced in subsequent stages of the process more fully referred to hereinafter.

When operating in this manner I have found that the phosphate rock-nitric acid magma can be handled without any difficulty and that a dicalcium phosphate can readily be obtained containing less than 1% citrate insoluble $P_2O_5$, whereas, when no diluting agent is added prior to the ammoniation, the product contains 10-15% citrate insoluble $P_2O_5$.

I have also found, apart from the conditions just stated, improved results are secured by ammoniating the magma remaining after the decomposition of phosphate rock with a gaseous mixture of ammonia and an inert gas and, further, in accomplishing the ammoniation by forcing said gaseous mixture into the air-filled space above the level of the agitated magma contained in a closed vessel. In this way a product is obtained containing only 0.25% citrate insoluble $P_2O_5$, whereas, otherwise, e. g. by bubbling ammonia alone through the magma, a product will result which contains citrate insoluble material to the extent of 1.5% or more.

I have found further that the unavailable or citrate insoluble $P_2O_5$ in the product obtained is decreased by ammoniation of the phosphate rock-nitric acid magma by adding a small amount of sodium silicate to the acid-rock magma before or during ammoniation, but preferably when the ammoniation is approximately one-half completed. Thus, for example, a product will be obtained which contains 2.8% citrate insoluble $P_2O_5$ while under like conditions without the use of sodium silicate 5.9% of the total product will be citrate insoluble $P_2O_5$.

As a further element of my invention I have discovered that improved results are secured in the first step, i. e. the decomposing of phosphate rock with nitric acid, by adding the rock to the acid. This manner of operation is generally desirable to obtain the full benefit of the action of acid on rock from the inception of the operation, since thereby a more efficient and rapid dissolution of the rock is obtained than when the acid is added to the rock. I have found, moreover, that by gradually adding the rock until just before precipitation of monocalcium phosphate, filtering off the gangue and adding the remainder of the rock, approximately 90% of the insoluble non-phosphatic material otherwise remaining in the product will be eliminated, and thereby less unavailable $P_2O_5$ in the final product will be obtained.

While the conditions above set forth are independently of importance, they may advantageously be used in combination one with another and I have, in fact, found the best results to be obtained when all the various conditions mentioned are observed.

According to the preferred embodiment of the invention the process may be divided broadly into three stages: (1) the reaction of phosphate rock with nitric acid to give a magma consisting essentially of monocalcium phosphate suspended in a solution of calcium nitrate and phosphoric acid; (2) the addition of ammonia to the magma of stage (1), giving a precipitate of dicalcium phosphate in a mother liquor consisting essentially of a solution containing calcium nitrate and ammonium nitrate; (3) the treatment of the mother liquor from stage (2) with ammonia and carbon dioxide to give a solution of ammonium nitrate and a precipitate of calcium carbonate; (4) separation of the calcium carbonate and concentration of the ammonium nitrate liquor; and (5) mixing the concentrated liquor with the calcium carbonate and granulating the mixture. These steps are followed in the order given and, broadly speaking, are preferably effected in detail as follows:

(1) Phosphate rock, which may be regarded as tricalcium phosphate, is gradually added to nitric acid and the mixture thoroughly agitated for about four hours. For stage (2) it is desirable to add some diluent to this acid-rock magma, preferably the end mother liquor of calcium and ammonium nitrates from a preceding operation of stage (2). The addition of the diluent may be accomplished by slowly adding it to the acid-rock magma and agitating the mixture until equilibrium is again established, that is, until any citrate insoluble $P_2O_5$ which may have been formed as a meta-stable phase has been converted to the stable citrate soluble or water soluble form.

(2) In ammoniating the magma, ammonia gas is forced into the closed air-filled space above the acid-rock magma so that an atmosphere with a small partial pressure of ammonia is maintained and the magma is agitated sufficiently violently to keep its surface broken. Thus dicalcium phosphate is precipitated and then separated from the mother liquor. In this case, as well as in any other method used, the ammoniation is preferably carried to the point where the magma just fails to turn "butter yellow" indicator (benzine-azo-dimethylaniline) pink. This leaves the mother liquor slightly acid, and with a small amount, 0.1-0.3%, of $P_2O_5$ in solution. If the ammoniation be carried further increasing amounts of unavailable phosphate are formed.

I have found that the following factors aid in preventing the formation of unavailable phosphate of which I may use any one, or any possible combination of them in step (2):

(a) The addition of a diluent, such as mother liquor from stage (2) of a preceding cycle, to the acid-rock magma before ammoniation, in an amount equal to roughly 25% or more of the weight of the magma, preferably about 50%. The end liquor from stage (3), ammonium nitrate solution, may also be used as the diluent. In the operation of this stage of the process it is very desirable to produce large crystals of dicalcium phosphate. I have found that the use of a diluent in the manner indicated above will accomplish this purpose.

(b) The temperature may be varied within a wide range. Generally speaking, however, the use of a relatively elevated temperature tends to increase the fluidity of the magma, but it is unfavorable to the effective absorption of ammonia. On the other hand, with relatively low temperatures the fluidity of the magma diminishes but at the same time the precipitation of hydrated dicalcium phosphate in desirable physical form and high yield is favored. Taking into account the various facts mentioned I prefer to operate at a temperature of about 30° C.–50° C.

(c) The addition of a small amount of a soluble silicate, such as sodium silicate, one per cent. for example, to the magma, preferably when the ammoniation is about half completed.

(3) The mother liquor from stage (2), consisting essentially of calcium and ammonium nitrates, is treated in a suitable apparatus with ammonia and carbon dioxide. This precipitates all calcium as calcium carbonate, and leaves a solution of ammonium nitrate.

The ammonia and carbon dioxide may either be added to the liquor simultaneously, or the required amount of ammonia may be dissolved in the liquor and the carbon dioxide then added. Either pure carbon dioxide, or any mixture of carbon dioxide with air or other inert gases may be employed.

While it is to be understood that the invention herein described is susceptible of considerable variation and modification in the manner of its practical application, particularly as regards proportions of materials, apparatus and specific conditions of operation, the following example will serve to illustrate how the invention may be practiced.

Referring to the drawing, the principal operation of Steps (1) and (2) are carried out in agitator 1 and ammoniator 2 respectively. Step (3) is largely effected in saturator 4. The nature and functions of the apparatus parts are indicated by legends and will be set forth in detail below.

In the following example Florida land pebble phosphate rock, analyzing 32.25% $P_2O_5$ and 46.87% CaO, is used. The accompanying equations illustrate both the reaction and concentration involved in the various stages of the process. The formula

$$4Ca_3(PO_4)_2 \cdot 3CaO$$

is taken as representing the phosphatic material of the rock, as it expresses conveniently the $P_2O_5$ and CaO content and acid consuming capacity of the mineral phosphate.

(I) To initiate the process 93 parts of Florida land pebble rock phosphate are gradually added to 200 parts of 50% nitric acid during a period of about one hour and at about 30° C., thereby producing a phosphoric acid-calcium nitrate solution, as may be illustrated by the following equation:

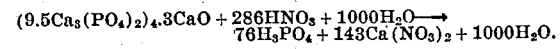
$$9.5Ca_3(PO_4)_2 \cdot 3CaO + 286HNO_3 + 1000H_2O \rightarrow \\ 76H_3PO_4 + 143Ca(NO_3)_2 + 1000H_2O.$$

The insoluble residue is separated and the clear solution reacted with 17 additional parts of phosphate rock, which reaction may be represented by the equation:

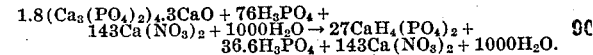
$$1.8(Ca_3(PO_4)_2) \cdot 3CaO + 76H_3PO_4 + \\ 143Ca(NO_3)_2 + 1000H_2O \rightarrow 27CaH_4(PO_4)_2 + \\ 36.6H_3PO_4 + 143Ca(NO_3)_2 + 1000H_2O.$$

Thereafter 133 parts of diluent, derived from stage (2) below and containing 79.4 mols $Ca(NO_3)_2$ and 127.2 mols $NH_4NO_3$ per 1000 mols $H_2O$, are added to the acid-rock magma in agitator 1, and the magma agitated at a temperature of about 30° C. for another three hours. The magma will then contain approximately 27 mols $CaH_4(PO_4)_2$, 36.6 mols $H_3PO_4$, 187 mols $Ca(NO_3)_2$, and 70.8 mols $NH_4NO_3$ per 1556 mols $H_2O$.

(II) This diluted magma is placed in an ammoniator, 2, and approximately 12 parts of gaseous ammonia forced into the closed air space above the magma so that an atmosphere with a small partial pressure of ammonia is maintained while the magma is agitated sufficiently violently to keep its surface broken. When the ammoniation is about one-half completed sodium silicate solution is introduced into the magma to an extent corresponding to 1% of the total weight of the magma. The temperature is maintained at 30° C. and the reaction is stopped by cutting off the ammonia supply when the magma just fails to turn "butter yellow" indicator pink, e. g. having a hydrogen ion concentration of pH=2 to 3. The reaction may be illustrated by the following equation:

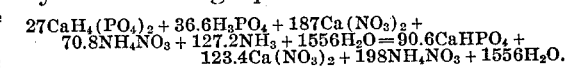
$$27CaH_4(PO_4)_2 + 36.6H_3PO_4 + 187Ca(NO_3)_2 + \\ 70.8NH_4NO_3 + 127.2NH_3 + 1556H_2O = 90.6CaHPO_4 + \\ 123.4Ca(NO_3)_2 + 198NH_4NO_3 + 1556H_2O.$$

Actually, although not represented in the above equation, there is at this point about 1 mol of $H_3PO_4$ in solution per 1000 mols of $H_2O$.

The products of this reaction are passed through a filter, 3, and 68.5 parts of the dicalcium phosphate recovered and dried in a drier, 6. In the wet, washed residue of dicalcium phosphate from stage (2) there is only 0.25% unavailable $P_2O_5$.

(III) 133 parts of filtrate or liquor are returned to agitator 1, as indicated in stage (1) above, and the 233 remaining parts of liquor passed into saturator 4 wherein 15 parts of ammonia and 19.4 parts of carbon dioxide are introduced. The resultant reaction may be illustrated by the following equation:

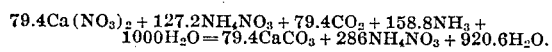
$$79.4Ca(NO_3)_2 + 127.2NH_4NO_3 + 79.4CO_2 + 158.8NH_3 + 1000H_2O = 79.4CaCO_3 + 286NH_4NO_3 + 920.6H_2O.$$

(IV) The calcium carbonate of stage (3) is separated by filtration from the ammonium nitrate liquor which latter is then concentrated by evaporation.

(V) The calcium carbonate is then mixed with preferably not more than half of the concentrated liquor and the mixture is granulated in any suitable manner, such as, for example, stirring while hot or by shotting in a heated tower, 10. The finished product, containing ammonium nitrate and calcium carbonate, is well adapted physically and chemically to the fertilizer requirements of storage, shipment and distribution.

Instead of using ammonia and carbon dioxide as such in stage (3) the ammonia and carbon dioxide may be replaced wholly or in part by a compound of ammonia, such as ammonium carbonate, ammonium bicarbonate, or ammonium carbamate. It is desirable, however, that ammonia and carbon dioxide be added in the stoichiometric ratio of two mols of the former to one mol of the latter.

The ammoniation in stage (2) may be carried out in various ways, other than the method above described, such as (1) by passing small bubbles of ammonia gas directly into the acid-rock magma, the magma being thoroughly agitated with a mechanical mixing device; (2) dissolving the ammonia in all or part of the diluent mentioned under stage (1) and slowly adding this solution to the acid-rock magma with thorough agitation; or, (3) agitating the acid-rock magma and ammoniating it by blowing therethrough a stream of air containing a small fraction of ammonia.

In this process I do not limit myself to Florida land pebble phosphate rock as described in the example, but may use any variety of phosphate rock, tricalcium phosphate or similar phosphatic material, natural or artificial.

Various changes may be made in the method described without departing from the invention or sacrificing any of the advantages thereof.

I claim:

1. Process for the production of dicalcium phosphate which comprises substantially completely decomposing phosphate rock with relatively concentrated nitric acid, thereafter adding an aqueous diluting agent, and contacting the resultant magma with ammonia.

2. A cyclic process as set forth in claim 1 which comprises separating dicalcium phosphate from the ammoniated magma and utilizing at least a part of the residual liquor in diluting subsequent portions of magma before ammoniation.

In testimony whereof, I affix my signature.

ERNEST R. BOLLER.